(12) United States Patent
Osipov et al.

(10) Patent No.: US 9,645,245 B2
(45) Date of Patent: May 9, 2017

(54) GNSS SIGNAL PROCESSING METHODS AND APPARATUS

(75) Inventors: Alexander Osipov, Moscow (RU); Ilya Khazanov, Moscow (RU); Dmitry Kozlov, Moscow (RU); Gleb Zyryanov, Moscow (RU)

(73) Assignee: Trimble Inc., Sunnyvale, CA (US)

( * ) Notice: Subject to any disclaimer, the term of this patent is extended or adjusted under 35 U.S.C. 154(b) by 1193 days.

(21) Appl. No.: 13/611,329

(22) Filed: Sep. 12, 2012

(65) Prior Publication Data

US 2015/0301190 A1    Oct. 22, 2015

Related U.S. Application Data

(60) Provisional application No. 61/535,649, filed on Sep. 16, 2011.

(51) Int. Cl.
*G01S 19/33* (2010.01)
*G01S 19/41* (2010.01)
(Continued)

(52) U.S. Cl.
CPC .............. *G01S 19/33* (2013.01); *G01S 19/41* (2013.01); *G01S 19/42* (2013.01); *G01S 19/425* (2013.01); *G01S 19/43* (2013.01); *G01S 19/37* (2013.01)

(58) Field of Classification Search
CPC ........ G01S 19/33; G01S 19/425; G01S 19/41; G01S 19/42; G01S 19/43; G01S 19/37
See application file for complete search history.

(56) References Cited

U.S. PATENT DOCUMENTS

| | | |
|---|---|---|
| 5,311,194 A | 5/1994 | Brown |
| 5,323,322 A | 6/1994 | Mueller et al. |
| | (Continued) | |

FOREIGN PATENT DOCUMENTS

| | | |
|---|---|---|
| EP | 1 862 809 A1 | 12/2007 |
| EP | 2 037 291 A1 | 3/2009 |
| | (Continued) | |

OTHER PUBLICATIONS

International Search Report and Written Opinion of the International Searching Authority mailed May 31, 2011 in International Application No. PCT/US2010/002565 (six pages).
(Continued)

*Primary Examiner* — Cassie Galt
(74) *Attorney, Agent, or Firm* — Kilpatrick Townsend & Stockton LLP

(57) ABSTRACT

Methods and apparatus are presented for determining a position of a GNSS rover antenna from observations collected at the antenna over multiple epochs from satellite signals of multiple GNSS, wherein the observation data of each GNSS has a distinct data format. The observation data of each GNSS are presented in a generic GNSS data format, which differs from the distinct data format of the GNSS, to obtain a set of generic data. A set of difference data is prepared representing differences between the converted observation data and the generic data. When at least four satellites are tracked, the generic data of the tracked satellites of multiple GNSS are used to compute a standalone antenna position. When at least five satellites are tracked, the generic data of the tracked satellites of multiple GNSS are used to compute a real-time kinematic antenna position.

15 Claims, 17 Drawing Sheets

(51) Int. Cl.
  *G01S 19/42* (2010.01)
  *G01S 19/43* (2010.01)
  *G01S 19/37* (2010.01)

(56) References Cited

U.S. PATENT DOCUMENTS

| | | | |
|---|---|---|---|
| 5,828,336 | A | 10/1998 | Yunck et al. |
| 5,893,044 | A | 4/1999 | King et al. |
| 5,914,685 | A * | 6/1999 | Kozlov ............ G01S 19/44 342/357.26 |
| 6,295,021 | B1 | 9/2001 | Lichten et al. |
| 6,324,473 | B1 | 11/2001 | Eschenbach |
| 6,662,107 | B2 | 12/2003 | Gronemeyer |
| 7,117,417 | B2 | 10/2006 | Sharpe et al. |
| 7,292,185 | B2 | 11/2007 | Whitehead et al. |
| 7,312,747 | B2 | 12/2007 | Vollath et al. |
| 7,432,853 | B2 | 10/2008 | Vollath |
| 7,498,979 | B2 | 3/2009 | Liu et al. |
| 7,538,721 | B2 | 5/2009 | Vollath et al. |
| 7,541,975 | B2 | 6/2009 | Sever et al. |
| 7,576,690 | B2 | 8/2009 | Vollath |
| 7,589,668 | B2 | 9/2009 | Vollath et al. |
| 7,692,578 | B2 | 4/2010 | Vollath et al. |
| 7,746,272 | B2 | 6/2010 | Vollath |
| 7,755,542 | B2 | 7/2010 | Chen et al. |
| 7,768,449 | B2 | 8/2010 | Gaal et al. |
| 7,868,820 | B2 | 1/2011 | Kolb |
| 7,961,143 | B2 | 6/2011 | Dai et al. |
| 7,982,667 | B2 | 7/2011 | Vollath et al. |
| 8,018,377 | B2 | 9/2011 | Collins |
| 8,035,552 | B2 | 10/2011 | Dai et al. |
| 8,130,143 | B2 | 3/2012 | Liu et al. |
| 8,237,609 | B2 | 8/2012 | Talbot et al. |
| 8,242,953 | B2 | 8/2012 | Dai et al. |
| 8,260,551 | B2 | 9/2012 | Janky et al. |
| 8,334,807 | B2 | 12/2012 | Gaal et al. |
| 8,368,590 | B2 | 2/2013 | Vollath et al. |
| 8,368,591 | B2 | 2/2013 | Talbot et al. |
| 8,400,351 | B2 | 3/2013 | Talbot et al. |
| 8,456,356 | B2 * | 6/2013 | Whitehead ............ G01S 19/35 342/357.21 |
| 8,542,146 | B2 | 9/2013 | Vollath |
| 8,558,736 | B2 | 10/2013 | Talbot et al. |
| 8,587,475 | B2 | 11/2013 | Leandro |
| 8,614,642 | B2 | 12/2013 | Talbot et al. |
| 8,694,250 | B2 | 4/2014 | Talbot et al. |
| 8,704,708 | B2 | 4/2014 | Vollath |
| 8,704,709 | B2 | 4/2014 | Vollath et al. |
| 2003/0016147 | A1 | 1/2003 | Evans |
| 2003/0048218 | A1 | 3/2003 | Milnes et al. |
| 2005/0055160 | A1 | 3/2005 | King |
| 2005/0064878 | A1 | 3/2005 | O'Meagher |
| 2005/0101248 | A1 | 5/2005 | Vollath |
| 2007/0063894 | A1 | 3/2007 | Yu |
| 2007/0120733 | A1 * | 5/2007 | Vollath ............ G01S 19/44 342/357.27 |
| 2007/0200753 | A1 | 8/2007 | Fuchs et al. |
| 2008/0036654 | A1 | 2/2008 | Hansen et al. |
| 2008/0192242 | A1 | 8/2008 | Nichols |
| 2008/0204312 | A1 | 8/2008 | Euler |
| 2008/0238768 | A1 | 10/2008 | Nasworthy |
| 2008/0258966 | A1 | 10/2008 | Sugimoto et al. |
| 2009/0009386 | A1 * | 1/2009 | van Diggelen ......... G01S 19/33 342/357.67 |
| 2009/0027264 | A1 | 1/2009 | Chen et al. |
| 2009/0098880 | A1 | 4/2009 | Lindquist |
| 2009/0109090 | A1 | 4/2009 | Vollath |
| 2009/0135057 | A1 | 5/2009 | Vollath et al. |
| 2009/0140914 | A1 | 6/2009 | Talbot et al. |
| 2009/0179792 | A1 | 7/2009 | Remondi |
| 2009/0179793 | A1 | 7/2009 | Remondi |
| 2009/0182502 | A1 * | 7/2009 | Riter ............ G01S 19/40 701/472 |
| 2009/0184869 | A1 | 7/2009 | Talbot et al. |
| 2009/0224969 | A1 | 9/2009 | Kolb |
| 2009/0237298 | A1 | 9/2009 | Vollath et al. |
| 2009/0322600 | A1 | 12/2009 | Whitehead et al. |
| 2010/0033370 | A1 | 2/2010 | Lopez et al. |
| 2010/0049469 | A1 * | 2/2010 | Wirola ............ G01C 5/06 702/150 |
| 2010/0090889 | A1 * | 4/2010 | Hwang ............ G01S 19/09 342/357.68 |
| 2010/0141515 | A1 | 6/2010 | Doucet et al. |
| 2010/0156709 | A1 | 6/2010 | Zhang et al. |
| 2010/0177806 | A1 | 7/2010 | Normark et al. |
| 2010/0214162 | A1 | 8/2010 | Talbot et al. |
| 2010/0245168 | A1 | 9/2010 | Rollet et al. |
| 2010/0253575 | A1 | 10/2010 | Vollath |
| 2011/0140959 | A1 | 6/2011 | Vollath |
| 2011/0148698 | A1 | 6/2011 | Vollath |
| 2011/0156949 | A1 | 6/2011 | Vollath et al. |
| 2011/0187590 | A1 | 8/2011 | Leandro |
| 2011/0267228 | A1 | 11/2011 | Talbot et al. |
| 2011/0279314 | A1 | 11/2011 | Talbot et al. |
| 2011/0285587 | A1 | 11/2011 | Vollath et al. |
| 2012/0026038 | A1 | 2/2012 | Vollath |
| 2012/0092213 | A1 | 4/2012 | Chen |
| 2012/0119944 | A1 | 5/2012 | Chen |
| 2012/0154210 | A1 | 6/2012 | Landau et al. |
| 2012/0154214 | A1 | 6/2012 | Leandro |
| 2012/0154215 | A1 | 6/2012 | Vollath et al. |
| 2012/0162007 | A1 | 6/2012 | Leandro et al. |
| 2012/0163419 | A1 | 6/2012 | Seeger |
| 2012/0229332 | A1 | 9/2012 | Vollath et al. |
| 2012/0286991 | A1 | 11/2012 | Chen et al. |
| 2012/0293367 | A1 | 11/2012 | Chen et al. |
| 2012/0306694 | A1 | 12/2012 | Chen et al. |
| 2013/0044026 | A1 | 2/2013 | Chen et al. |
| 2013/0335266 | A1 | 12/2013 | Vollath et al. |
| 2014/0002300 | A1 | 1/2014 | Leandro et al. |
| 2014/0015712 | A1 | 1/2014 | Leandro et al. |

FOREIGN PATENT DOCUMENTS

| | | |
|---|---|---|
| WO | 03/038464 A2 | 5/2003 |
| WO | 2005/043186 A2 | 5/2005 |
| WO | 2007/082038 A1 | 7/2007 |
| WO | 2010/096159 A2 | 8/2010 |

OTHER PUBLICATIONS

International Search Report and Written Opinion of the International Searching Authority mailed May 31, 2011 in International Application No. PCT/US2010/002564 (seven pages).
International Search Report and Written Opinion of the International Searching Authority mailed May 30, 2011 in International Application No. PCT/US2010/002563 (six pages).
International Search Report and Written Opinion of the International Searching Authority mailed May 26, 2011 in International Application No. PCT/US2010/002562 (six pages).
International Search Report and Written Opinion of the International Searching Authority mailed May 31, 2011 in International Application No. PCT/US2010/002581 (six pages).
International Search Report and Written Opinion of the International Searching Authority mailed Sep. 27, 2011 in International Application No. PCT/US2011/024733 (ten pages).
International Search Report and Written Opinion of the International Searching Authority mailed Oct. 6, 2011 in International Application No. PCT/US2011/024743 (ten pages).
International Search Report and Written Opinion of the International Searching Authority mailed Sep. 26, 2011 in International Application No. PCT/US2011/024763 (ten pages).
International Search Report and Written Opinion of the International Searching Authority mailed Oct. 12, 2012 in International Application No. PCT/US2012/029694 (fourteen pages).
International Search Report and Written Opinion of the International Searching Authority mailed Oct. 16, 2012 in International Application No. PCT/US2012/028670 (eight pages).
International Search Report and Written Opinion of the International Searching Authority mailed Sep. 5, 2012 in International Application No. PCT/US2012/028671 (eight pages).

(56) References Cited

OTHER PUBLICATIONS

S. Banville et al., "Satellite and Receiver Phase Bias Calibration for Undifferenced Ambiguity Resolution," Proceedings of the 2008 National Technical Meeting of The Institute of Navigation, San Diego, CA, Jan. 2008, pp. 711-719.
Y. Bar-Sever et al., "A new model for GPS yaw attitude," Journal of Geodesy, vol. 70, No. 11, Nov. 1996, pp. 714-723 (abstract only).
G. Bierman, Factorization Methods for Discrete Sequential Estimation, Academic Press, Inc., 1977, 129 pp.
S. Bisnath et al., "Precise Orbit Determination of Low Earth Orbiters with GPS Point Positioning," Proceedings of the 2001 National Technical Meeting of The Institute of Navigation, Long Beach, CA, Jan. 2001, pp. 725-733.
P. Collins, "Isolating and Estimating Undifferenced GPS Integer Ambiguities," Proceedings of the 2008 National Technical Meeting of The Institute of Navigation, San Diego, CA, Jan. 2008, pp. 720-732.
P. Collins et al., "Precise Point Positioning with Ambiguity Resolution using the Decoupled Clock Model," Proceedings of the 21st International Technical Meeting of the Satellite Division of The Institute of Navigation (ION GNSS 2008), Savannah, GA, Sep. 2008, pp. 1315-1322.
P. Collins et al., "Accessing and Processing Real-Time GPS Corrections for Precise Point Positioning . . . Some User Considerations," Proceedings of the 18th International Technical Meeting of the Satellite Division of The Institute of Navigation (ION GNSS 2005), Long Beach, CA, Sep. 2005, pp. 1483-1491.
Y. Gao et al., "A New Method for Carrier-Phase-Based Precise Point Positioning", Navigation, Journal of The Institute of Navigation, vol. 49, No. 2, Summer 2002, pp. 109-116.
"GNSS Solutions: Precise Point Positioning and Its Challenges, Aided-GNSS and Signal Tracking," Inside GNSS, Nov./Dec. 2006, pp. 16-21.
M. Gabor et al., "Satellite-Satellite Single-Difference Phase Bias Calibration as Applied to Ambiguity Resolution", Navigation, Journal of The Institute of Navigation, vol. 49, No. 4, Winter 2002-2003, pp. 223-247.
M. Ge et al., "Resolution of GPS carrier-phase ambiguities in Precise Point Positioning (PPP) with daily observations," Journal of Geodesy, Jul. 2008, vol. 82, Issue 7, pp. 389-399.
A. Hauschild et al., "Real-time Clock Estimation for Precise Orbit Determination of Leo-Satellites," Proceedings of the 21st International Technical Meeting of the Satellite Division of The Institute of Navigation (ION GNSS 2008), Savannah, GA, Sep. 2008, pp. 581-589.
P. Heroux et al., "GPS Precise Point Positioning Using IGS Orbit Products," Phys. Chem. Earth (A), vol. 26, No. 6-8. pp. 573-578, 2001.
P. Heroux et al., "GPS Precise Point Positioning with a Difference," presented at Geomeatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.
"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
J. Kouba et al., "Precise Point Positioning Using IGS Orbit and Clock Products," GPS Solutions, Oct. 2001, vol. 5, Issue 2, pp. 12-28.
D. Lapucha et al., "Comparison of the Two Alternate Methods of Wide Area Carrier Phase Positioning," Proceedings of the 17th International Technical Meeting of the Satellite Division of The Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of The Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of The Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of The Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of The Institute of Navigation, Monterey, CA, Jan. 2006, pp. 564-573.
S. Lo et al., "GNSS Album: Images and Spectral Signature of the New GNSS Signals," Inside GNSS, May/Jun. 2006, pp. 46-56.
W. Melbourne, "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of The Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827, May 9, 2000, two pages.
G. Seeber, Satellite Geodesy, 2d. Ed., 2003, p. 31.
P. Tetrault et al., "CSRS-PPP: An Internet Service for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wubbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.

\* cited by examiner

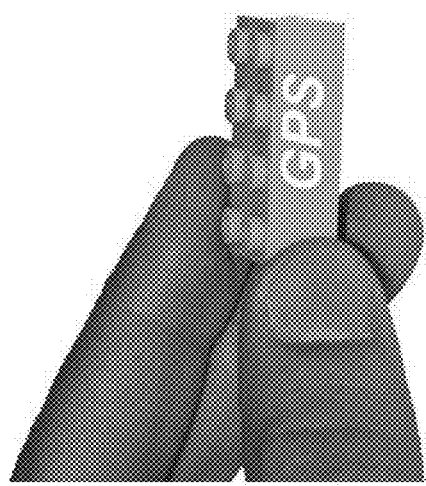
FIG. 2
Prior Art

|  | GPS | GLO | GAL | COM |
|---|---|---|---|---|
| Today constellation | Complete | Almost complete | Just started | Not complete |
| Completion date | N/A | 2011 | ??? | 2012 partially |
| Observation quality | Good | Admissible | Good | ? |
| Navigation quality | Good | Admissible | Good | ? |
| MS corrections | Good | Admissible | Not available | Not available |
| SS corrections | Good | Admissible | Not available | Not available |

FIG. 3
Prior Art
(status as of 2011)

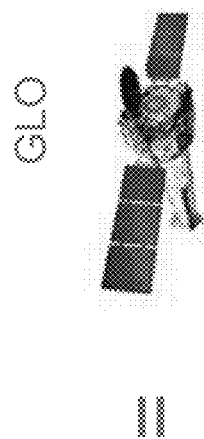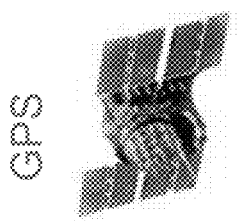
FIG. 4

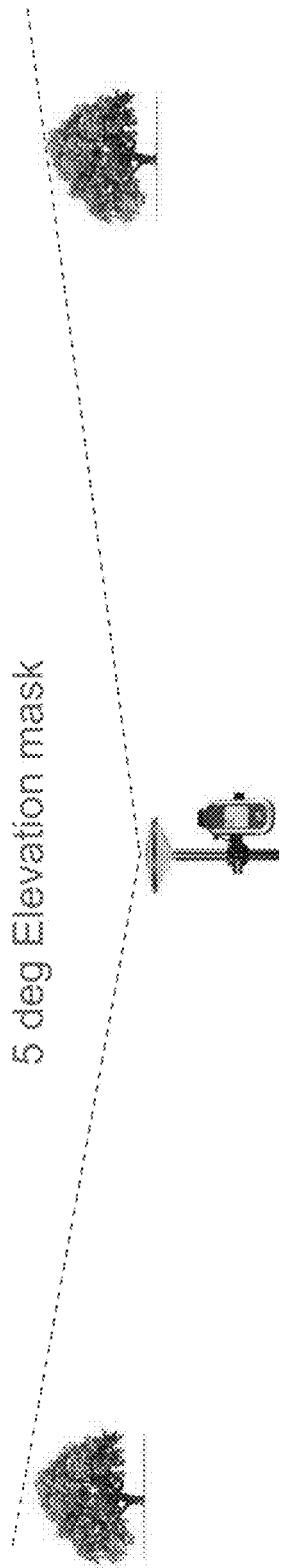

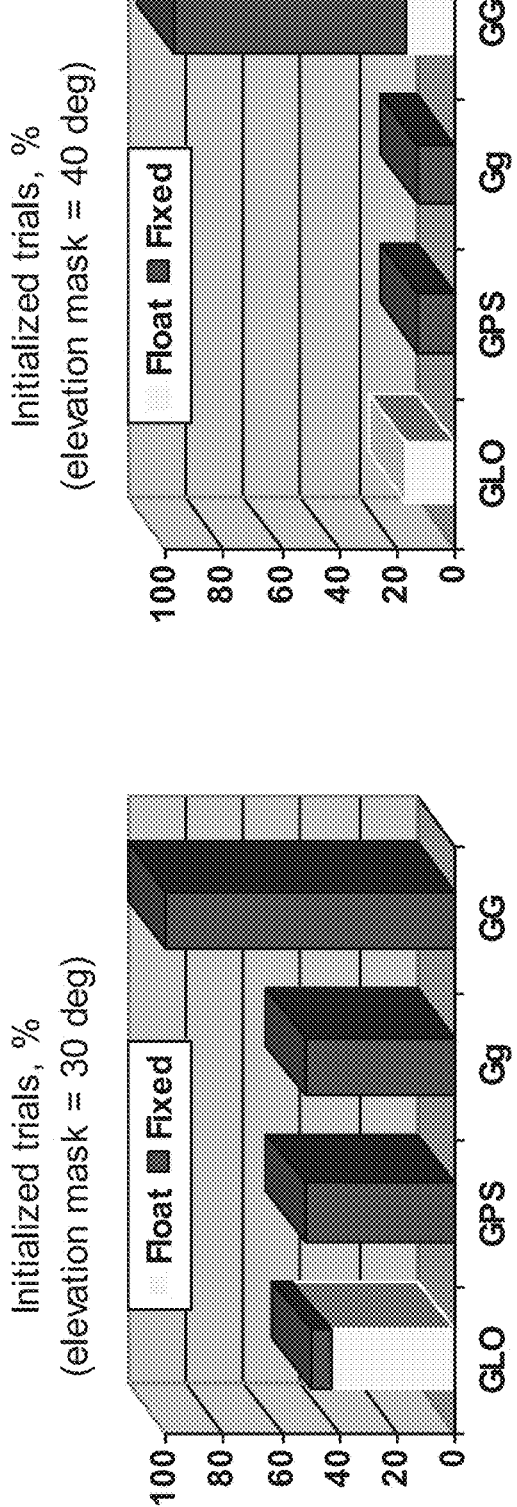

Typical Prior-Art GPS-centric receiver

GNSS SIGNAL PROCESSING METHODS AND APPARATUS

CROSS REFERENCE TO RELATED APPLICATIONS

The following is related hereto and incorporated herein in its entirety by this reference: U.S. Provisional Application for Patent No. 61/535,649 filed 16 Sep. 2011.

TECHNICAL FIELD

The present invention relates to the field of Global Navigation Satellite Systems GNSS). More particularly, the present invention relates to methods and apparatus for processing of GNSS data obtained from multiple GNSS.

BACKGROUND

Many manufacturers claim that their receivers are GNSS receivers. Some demonstrate this by showing how they track and use other-than-GPS signals. Others additionally demonstrate the user benefit an extra GNSS brings (usually position accuracy, availability, reliability).

And everyone concludes that GLONASS, Galileo, or Compass is (or at least can be) a good mate for GPS. The keyword here is "mate." A mate is not a master; a mate is not an equal partner. A mate is someone who help, but brings no value by itself.

One may ask if a GNSS receiver can still work well without receiving GPS or, in other words, whether the GNSS receiver is GPS-centric or not. A GPS-centric architecture works only if GPS is available; there is no position solution without GPS.

The first commercial professional GNSS (GPS+GLONASS™) product appeared in 1996. Later, the world's first GPS+GLONASS RTK technology was announced and implemented. At that time, the GLONASS constellation was large, but a few years later it declined dramatically.

After years of illness, GLONASS has returned to the GNSS market place and become the strong second player in most professional receivers. The current constellation is almost complete, and full GLONASS deployment was expected in 2011. Moreover, some (few) manufacturers now support the GLONASS-only mode. And some others start to better appreciate the value of GLONASS having now a clear vision of the planned GLONASS extension with CDMA signals.

GLONASS aside, new GNSS satellites started orbiting in the sky. Until now, none of these GNSS systems yet brings any extra value, the only exception being SBAS ranging which however has limited applicability.

It means that today the observables of new GNSSs are usually not used in the determination of the receiver position. Just because there are only a few of them, they cannot add value to GPS and GLONASS observables.

SUMMARY

Some embodiments of the invention provide methods and/or apparatus for determining a position of an antenna of a GNSS rover from observations of GNSS signals collected at the antenna over multiple epochs from satellite signals of multiple GNSS. Satellites of at least two GNSS are tracked to obtain observation data from the satellites' signals over a number of epochs, wherein the observation data of each GNSS has a distinct data format. The observation data of each GNSS are converted to a generic GNSS data format, which differs from the distinct data format of the GNSS, to obtain a set of generic data. A set of difference data is prepared representing differences between the converted observation data and the generic data. When at least four satellites are tracked, the generic data of the tracked satellites of multiple GNSS are used to compute a standalone antenna position.

In some embodiments, when at least five satellites are tracked, the generic data of the tracked satellites of multiple GNSS are used to compute a real-time kinematic antenna position.

Some embodiments provide computer program products comprising a non-transitory computer-usable medium embodying instructions for carrying out such methods.

BRIEF DESCRIPTION OF DRAWING FIGURES

These and other aspects and features of the present invention will be more readily understood from the embodiments described below with reference to the drawings, in which:

FIG. 2 illustrates the result of removing GPS from the architecture of FIG. 1;

FIG. 3 is a forecast of the status of GNSS constellations;

Figure 5:
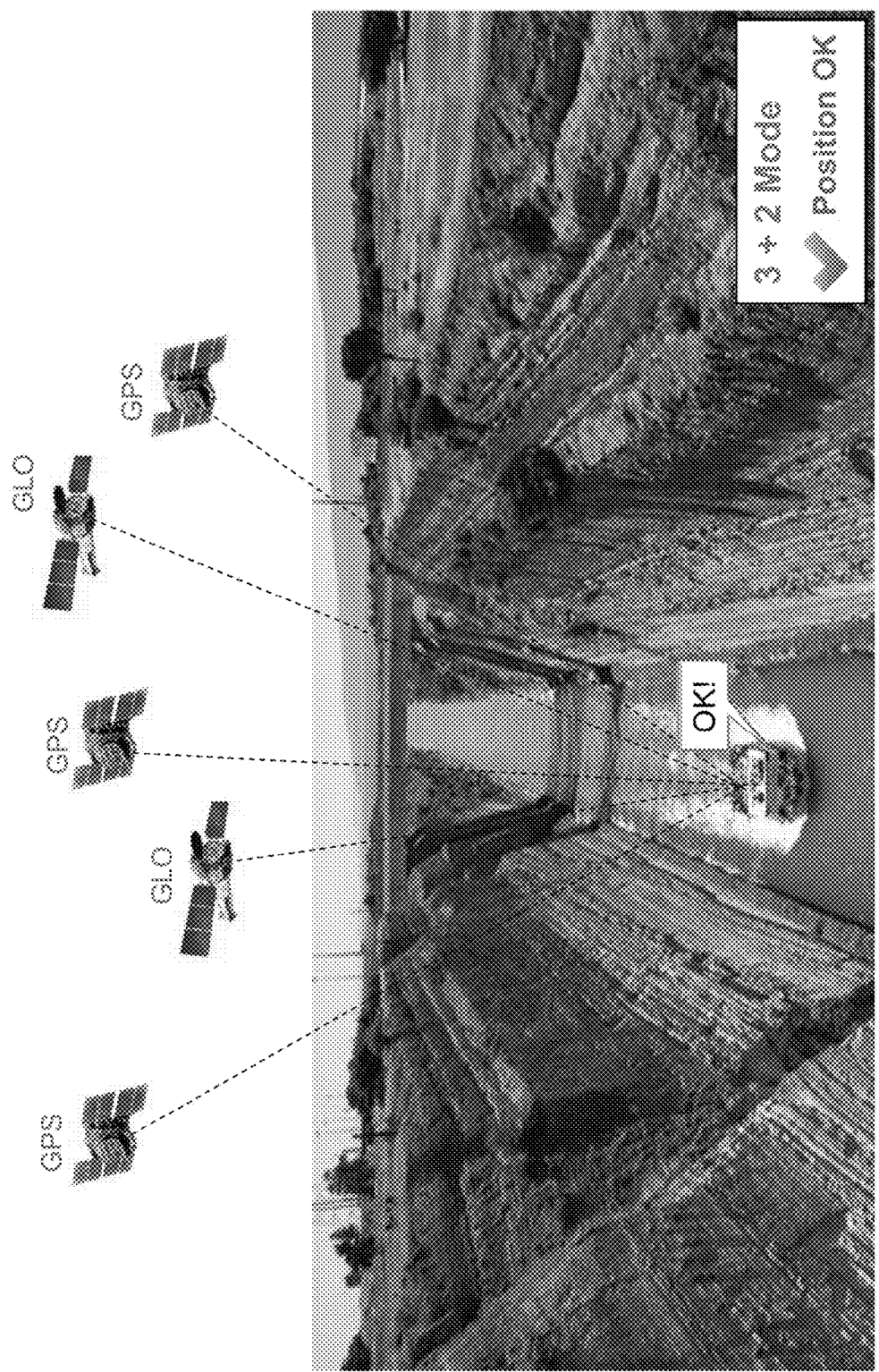
Figures 7A, 7B:
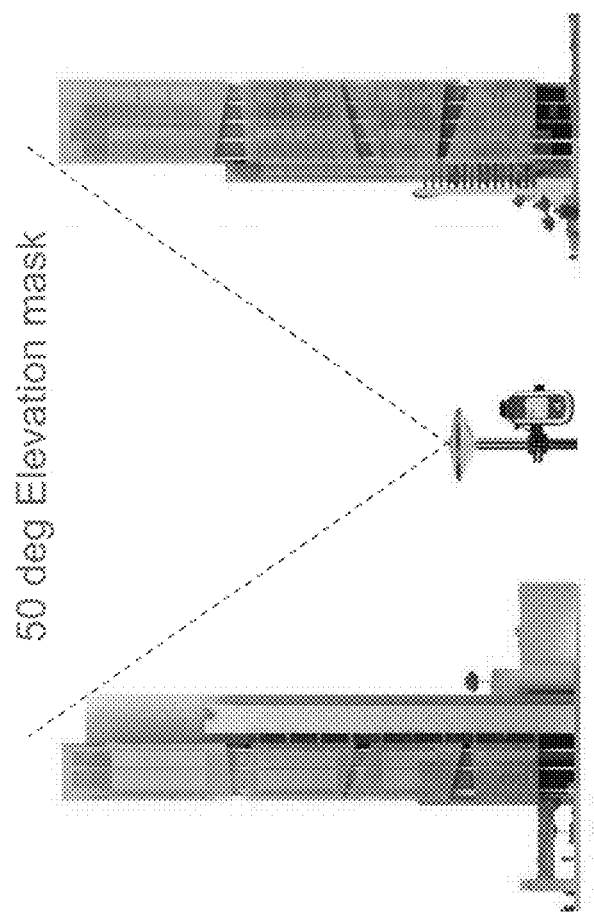
Figure 8:
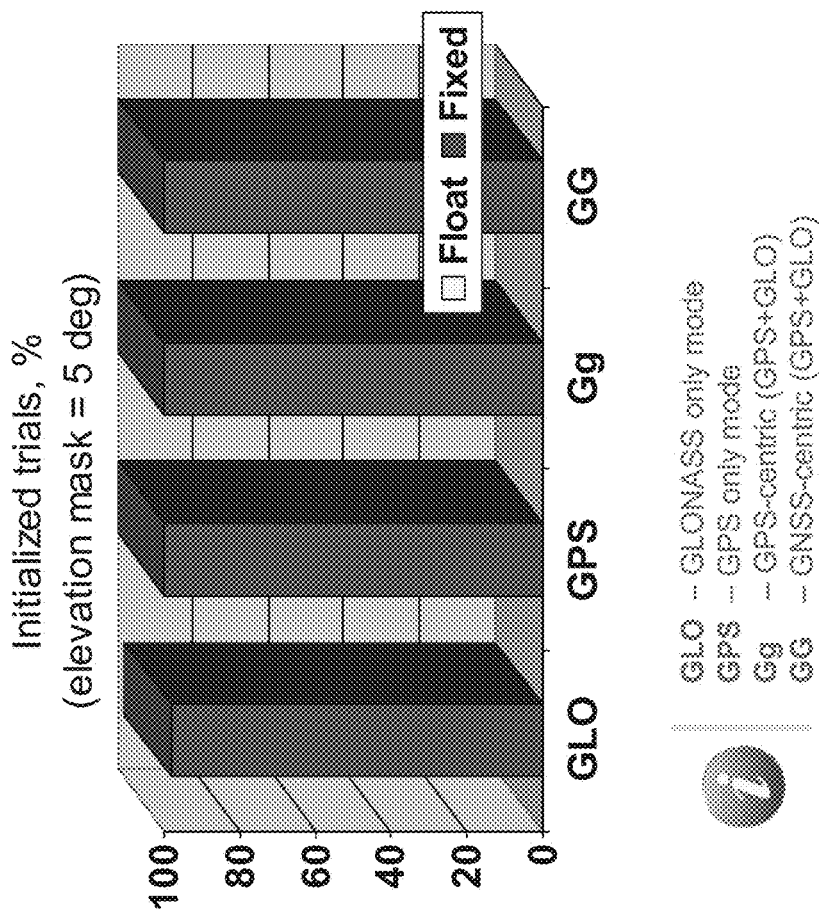
Figures 10A, 10B:
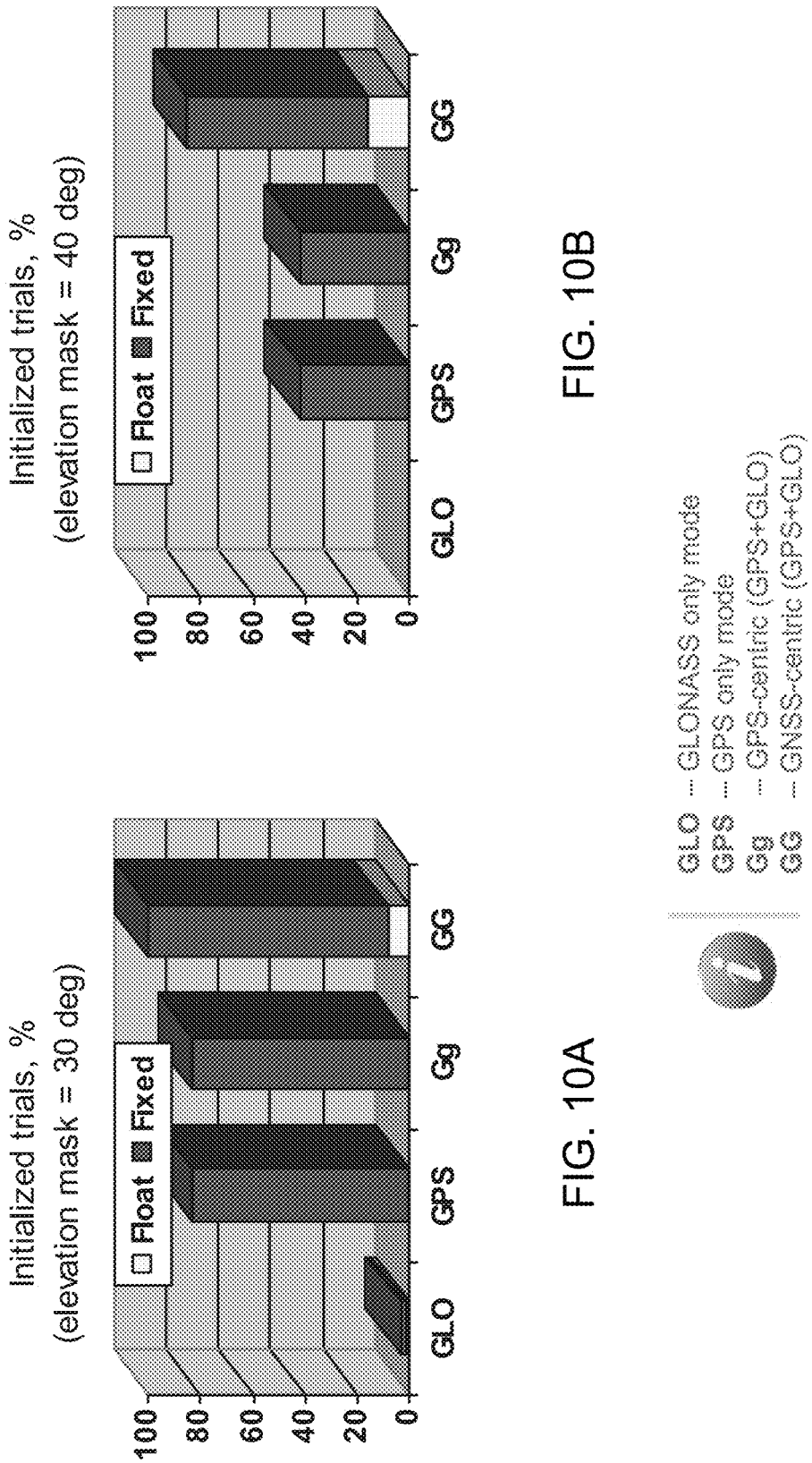
Figures 11A, 11B:
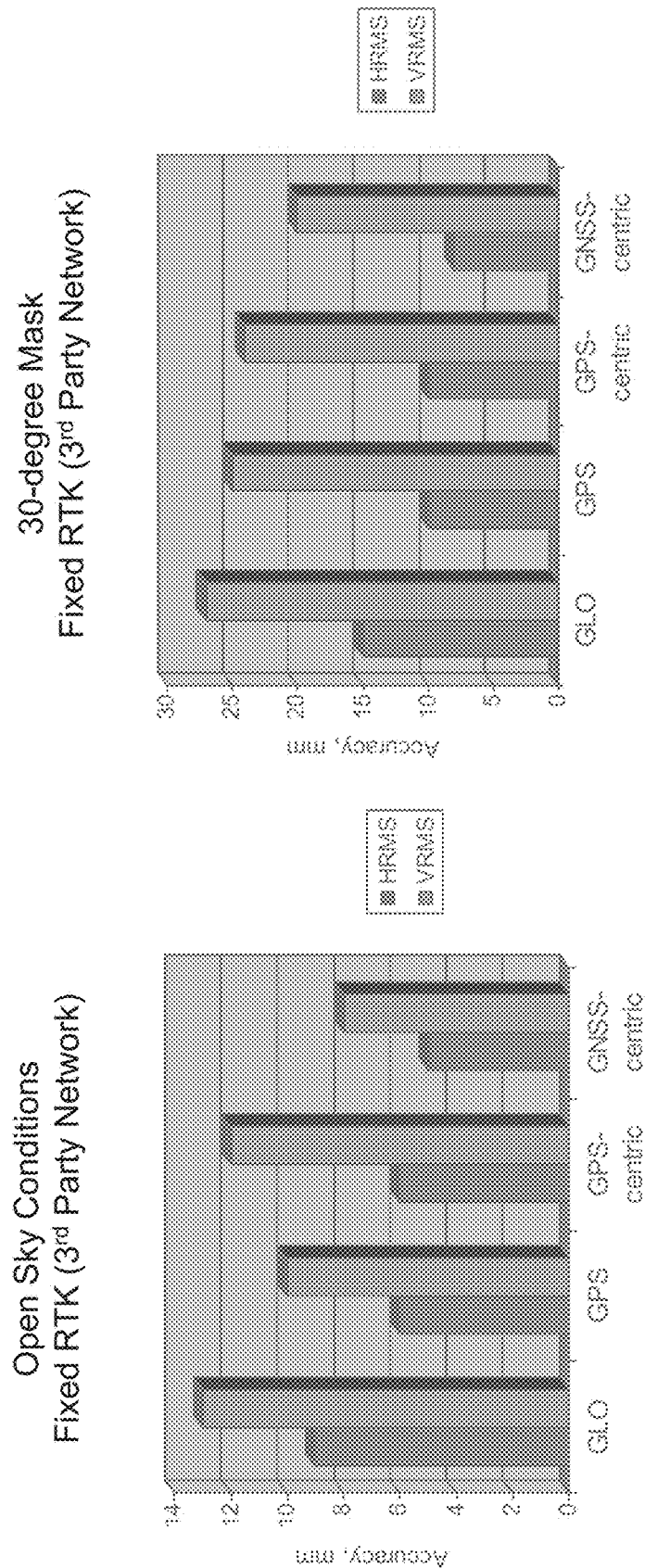
Figure 12:
Figure 13:
Figure 14:
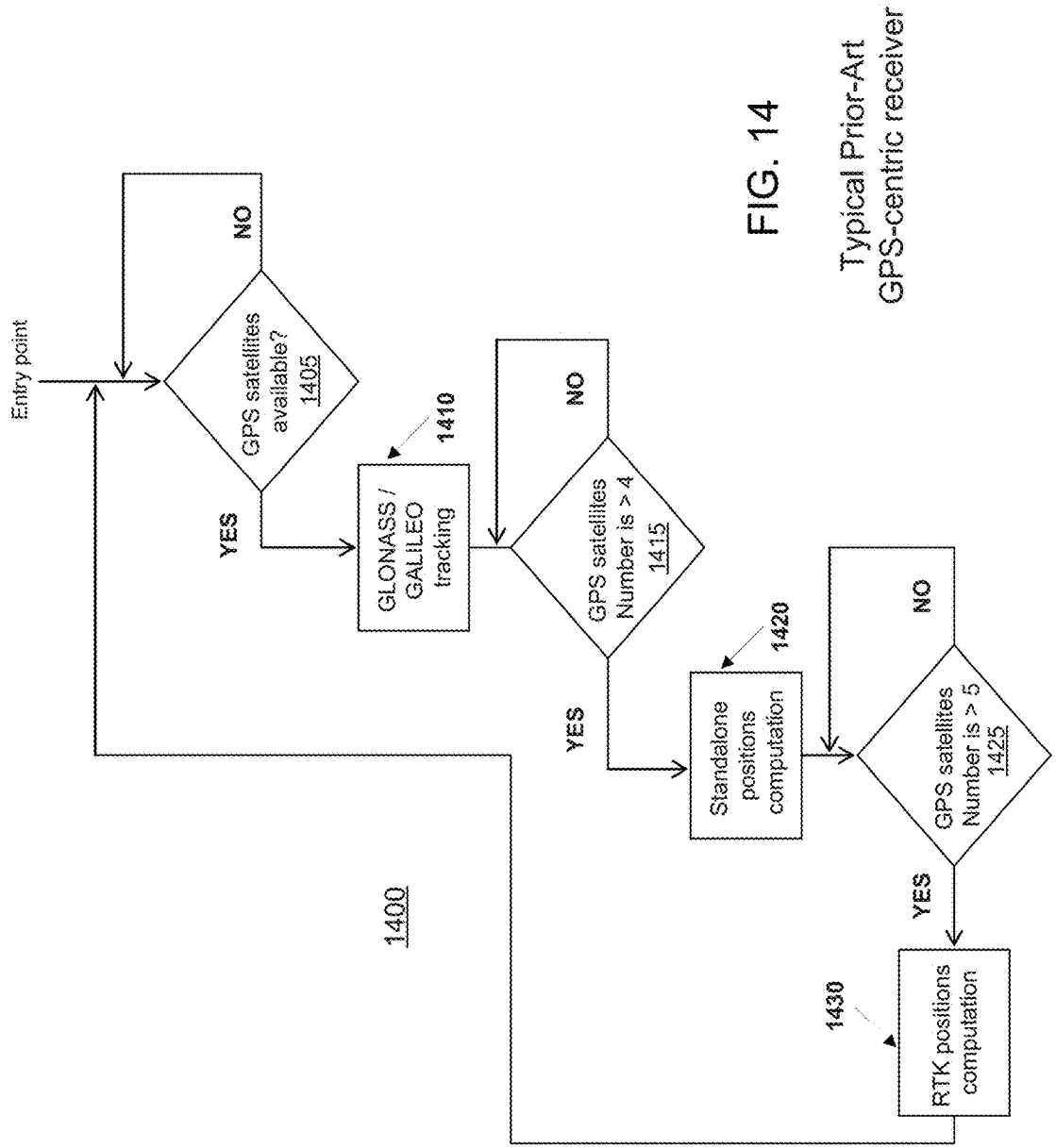
Figure 15:
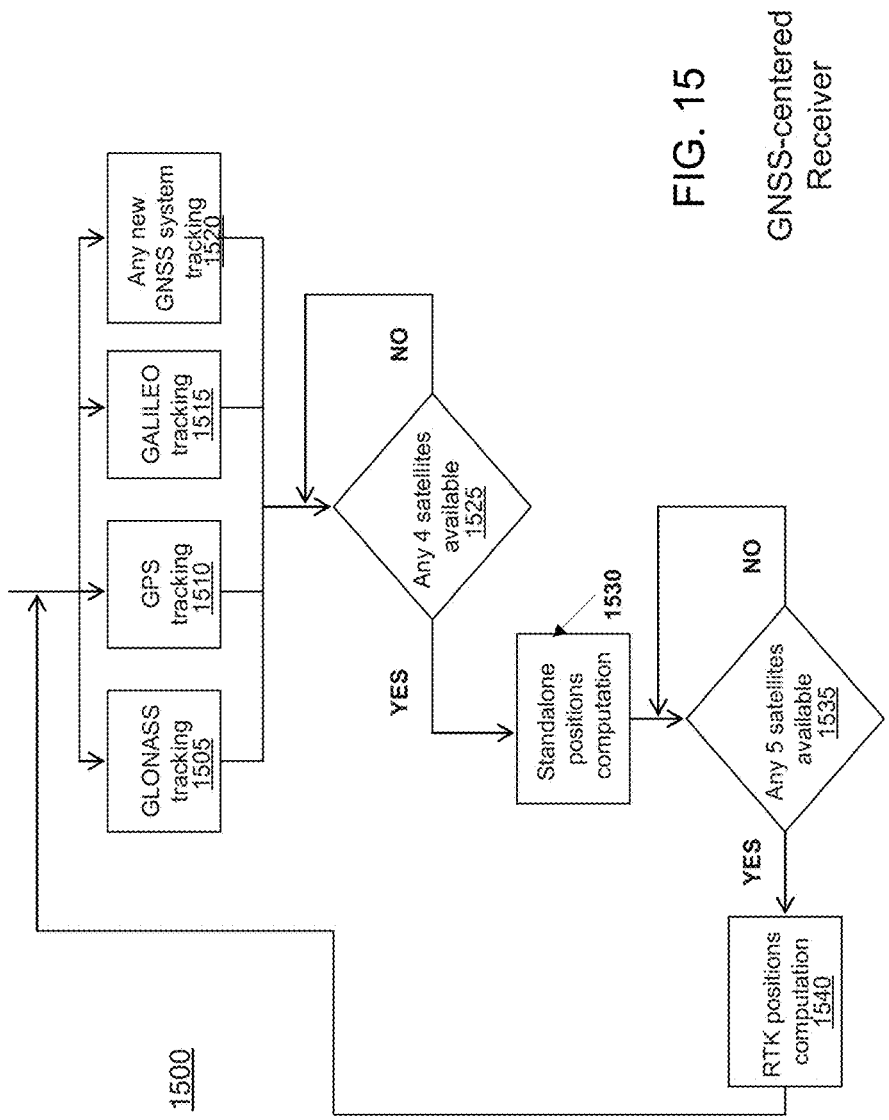
Figure 16:
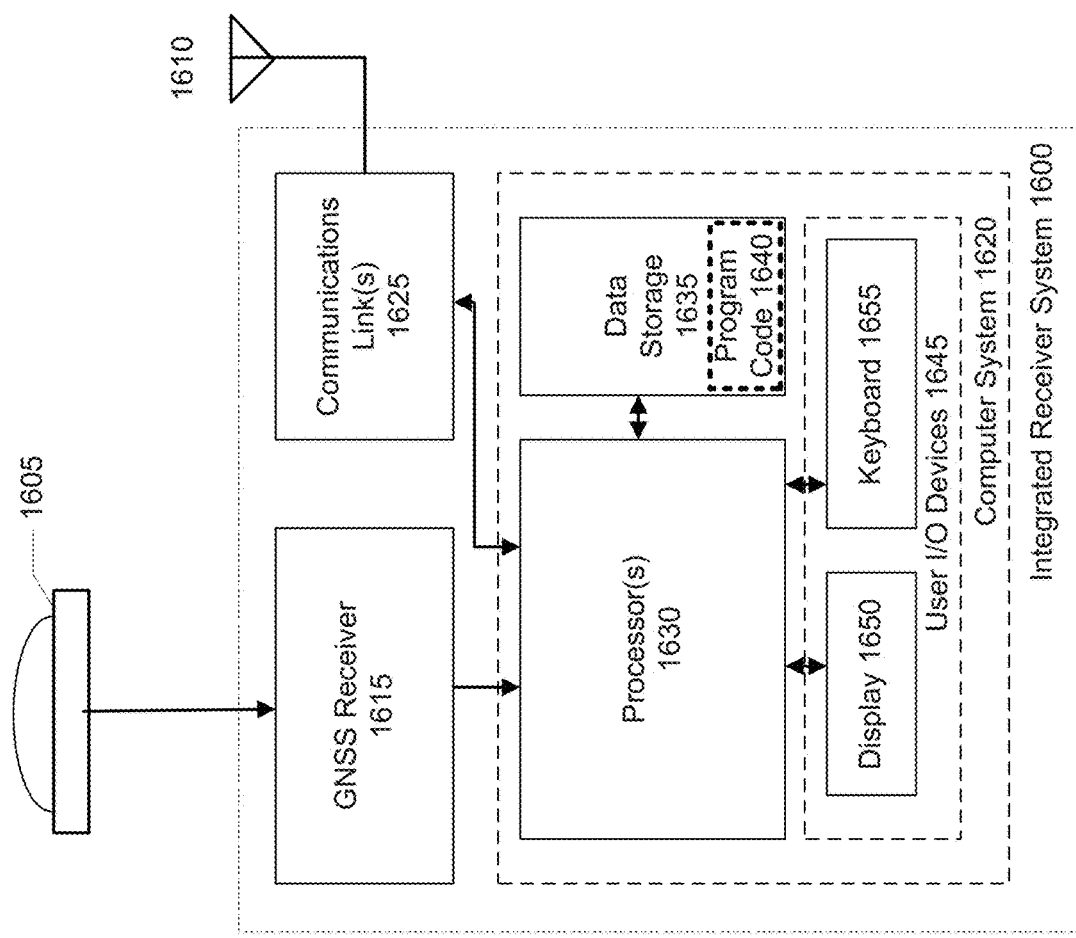
Figure 17:
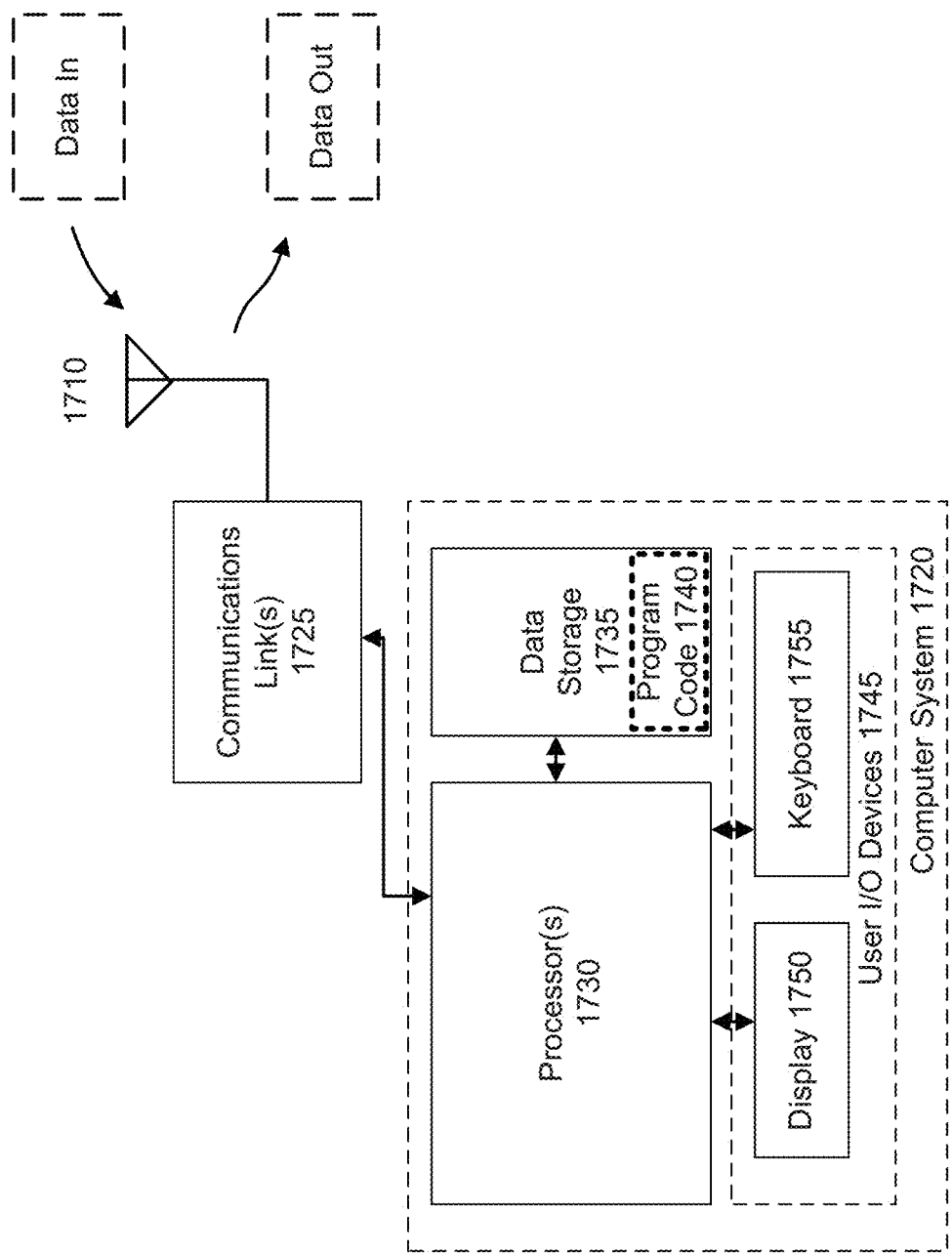

FIG. 4 graphically illustrates the concept of equally treating GPS and GLONASS;

FIG. 5 illustrates a scenario where a receiver receives signals from three GPS satellites and two GLONASS satellites;

FIG. 6A shows an open-sky environment;

FIG. 6B shows a comparison of accuracy between GNSS-centric processing and GPS-centric processing in the open sky environment of FIG. 6A;

FIG. 7A shows a non-open-sky environment;

FIG. 7B shows a comparison of accuracy between GNSS-centric processing and GPS-centric processing in the non-open-sky environment of FIG. 7B;

FIG. 8 shows comparative results of RTK (real-time-kinematic) initialization trials under open-sky conditions;

FIG. 9A shows comparative results of RTK initialization trials with the receiver's own base and an elevation mask of 30 degrees;

FIG. 9B shows comparative results of RTK initialization trials with the receiver's own base and an elevation mask of 40 degrees;

FIG. 10A shows comparative results of RTK initialization trials using third-party network corrections with an elevation mask of 30 degrees;

FIG. 10B shows comparative results of RTK initialization trials using third-party network corrections with an elevation mask of 40 degrees;

FIG. 11A compares the horizontal (HRMS) position accuracy and vertical (VRMS) position accuracy of RTK fixed solutions obtained using third-party network corrections for different GNSS modes, with no elevation constraint;

FIG. 11B compares the horizontal (HRMS) position accuracy and vertical (VRMS) position accuracy of RTK fixed solutions obtained using third-party network corrections for different GNSS modes, using a 30-degree mask;

FIG. 12 shows a plan view of a portion of a real-time drive test under medium shaded conditions, with comparison of results;

FIG. 13 shows a plan view of a portion of a real-time drive test under heavily shaded conditions, with comparison of results;

FIG. 14 shows the processing flow of a typical GPS-centric receiver;

FIG. 15 shows the processing flow of a GNSS-centric receiver in accordance with some embodiments of the invention;

FIG. 16 is a block diagram of a typical integrated GNSS receiver system used in some embodiments of the invention; and FIG. 17 is a schematic diagram of a computer system used in some embodiments of the invention.

DETAILED DESCRIPTION

Many manufacturers claim that their receivers are GNSS receivers. Some demonstrate this by showing how they track and use other-than-GPS signals. Others additionally demonstrate the user benefit an extra GNSS brings (usually position accuracy, availability, reliability).

And everyone concludes that GLONASS, Galileo, or Compass is (or at least can be) a good mate for GPS. The keyword here is "mate." A mate is not a master; a mate is not an equal partner. A mate is someone who help, but brings no value by itself.

One may ask if a GNSS receiver can still work well without receiving GPS or, in other words, whether the GNSS receiver is GPS-centric or not.

Figure 1:
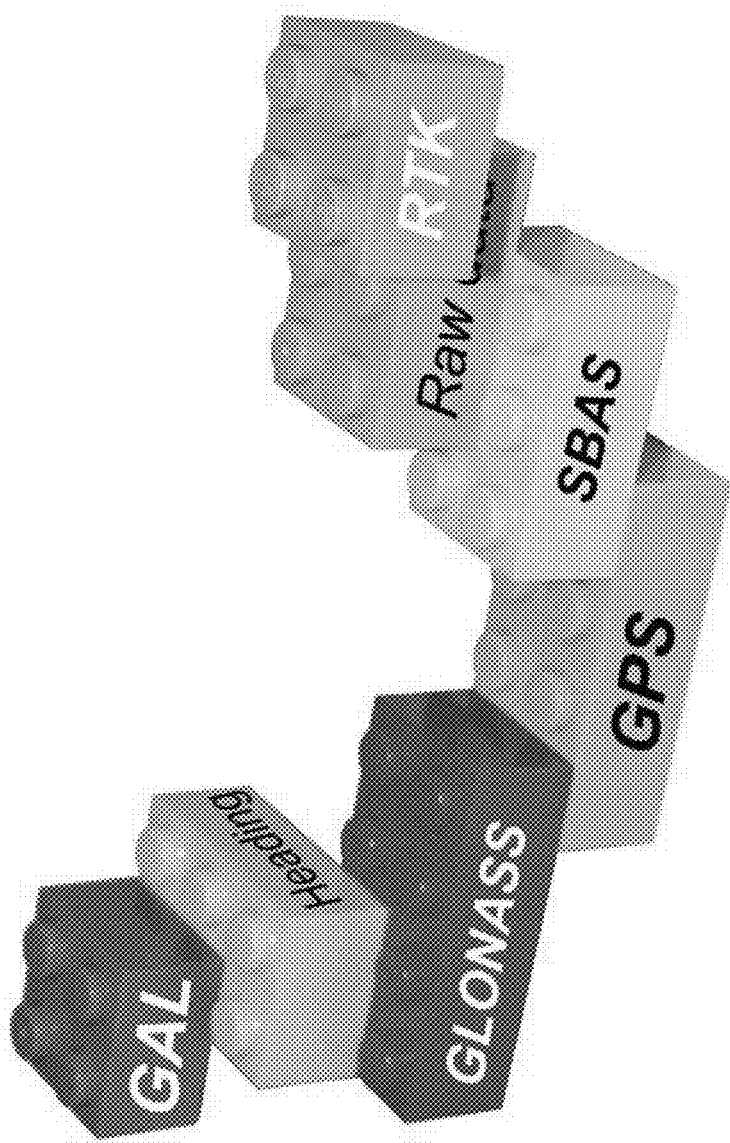
FIG. 1 illustrates a conceptual view of prior-art GNSS receiver processing architecture.

FIG. 1 illustrates a conceptual view of prior-art GNSS receiver processing architecture which is built on GPS. This architecture works as long as GPS is available.

FIG. 2 illustrates the result of removing GPS from the architecture of FIG. 1. The GPS-centric approach means that there is no solution without GPS.

The differences between a GPS-centric and a non-GPS-centric GNSS solution raise two principal issues: (1) the ability to provide a complete solution when one or more of the multiple GNSSs is unavailable, and (2) working in harsh conditions when any single GNSS is not able (even theoretically) to provide a position solution.

Symbols "2+2" and/or "3+3" are used herein to point out conditionally such a GNSS environment in which, for example, signals are available from only two GPS satellites and two GLONASS satellites ("2+2") or three GPS satellites and three GLONASS satellites ("3+3").

Examples of both standalone and differential types of positioning are given, with primary accent on Fixed RTK ("real-time kinematic") performance. The quantitative results given herein were obtained with Ashtech GNSS receivers.

The first commercial professional GNSS (GPS+GLONASS™) product appeared in 1996. "The GG24 Combined GPS+GLONASS Receiver", S. Gourevitch, S. Sila-Novitsky, F. van Diggelen, Proceedings of ION-GPS '96, September 17-20, Kansas City, Mo.

Later, the world's first GPS+GLONASS RTK technology was announced and implemented. "Centimeter Level Real-Time Kinematic Positioning with GPS+GLONASS C/A Receivers", D. Kozlov, M. Tkachenko, Navigation: Journal of the Institute of Navigation, vol. 45, No. 2, Summer 1998, pp. 137-147; D. Kozlov, A. Povaliaev, L. Rapoport, S. Sila-Novitsky, V. Yefriemov, "Relative Position Measuring Techniques Using Both GPS and GLONASS Carrier Phase Measurements", U.S. Pat. No. 5,914,685, Jun. 22, 1999. At that time, the GLONASS constellation was large, but a few years later it declined dramatically.

After years of illness, GLONASS has returned to the GNSS market place and become the strong second player in most professional receivers. The current constellation is now complete. Moreover, some (few) manufacturers now support the GLONASS-only mode. And some others start to better appreciate the value of GLONASS having now a clear vision of the planned GLONASS extension with CDMA signals.

GLONASS aside, new GNSS satellites started orbiting in the sky. Until now, none of these GNSS systems yet brings any extra value, the only exception being SBAS ranging which however has limited applicability. "Combined Processing of GPS, GLONASS and SBAS Code Phase and Carrier Phase Measurements", L. Wanninger, S. Wallstab-Freitag, Proceedings of ION-GPS '2007, Fort Worth, Tex.; "L1 RTK System with Fixed Ambiguity: What SBAS Ranging Brings", A. Boriskin, D. Kozlov, G. Zyryanov, Proceedings of ION-GPS '2007, Fort Worth, Tex.

It means that today the observables of new GNSSs are usually not used in the determination of the receiver position. Just because there are only a few of them, they cannot add value to GPS and GLONASS observables, even theoretically. Plus, professional receivers usually compute corrected (RTK) position, which requires not only tracking satellites, but also getting reference data (corrections) from some network service using standardized protocols. While such a service is widely available for GPS and GLONASS, it is not yet available for other GNSSs. But the progress can be very quick here.

The inventors believe that Galileo, Compass (and any other GNSS that may follow) will finally be strong enough to be reliable mates (or even equal partners) to GPS and GLONASS in future GNSS receivers. This position is based on the obvious progress (although slow for Galileo) of these GNSSs. Moreover, there is obviously a matured worldwide vision that although the existing GNSSs are controlled by different governments and societies, they nevertheless are the same generically speaking, and their data can be presented and processed in a universal manner. Apples can be green or red, they still remain apples.

The term "GPS" was long ago replaced by the politically and commercially correct term "GNSS," but in everyday conversations, people keep using the term "GPS" for GNSS capability: one goes to a shop to buy a (GPS?) navigator or cell phone with a (GPS?) navigation function inside. The relative percentage of words 'GPS' and 'GNSS' in reference manuals or data sheets is also worthy of note.

Why is it so? Is it because GPS sounds much better than GNSS? Yes, it can be so. Is it because these devices are still GPS only? Yes, in many cases, especially with consumer devices. Is there some stagnation in our minds? Yes, this may be the case as well.

But in many cases, the persisting use of the word "GPS" probably refers indirectly to the fact that the GPS still plays a key role in the navigation solutions of many devices, i.e. "no GPS" means "no position". A receiver can support GLONASS but will for a long time continue to be mistakenly named a "GPS device."

Consider the transition from the term "WAAS" (Wide-Area Augmentation System) to the term "SBAS" (Space-Based Augmentation System: the US space-based augmentation system WAAS historically appeared the very first, thus for a long time other systems like MSAS (Multi-functional Satellite Augmentation System) and EGNOS (European Geostationary Navigation Overlay Service) were called "WAAS" rather than "SBAS."

So in everyday life, minds and conversations are "GPS-centric". What about receivers?

Taking a given receiver at hand, one can look at it, read its datasheet and try to answer (at least to oneself) the following questions:

Does it have a GLONASS option? Does it have a GPS option? Are these options equal function-wise?

Can it track GLONASS in the absence of GPS? How can this be proven?

Can it deliver GLONASS-only standalone position of admissible quality?

Can it deliver GLONASS-only differential (including RTK fixed) position of admissible quality, including operation against a $3^{rd}$ party reference receiver which has GLONASS capability?

Can it start up when only few GPS and few GLONASS Satellites (e.g. "3+3") can potentially be acquired in given conditions?

Can it maintain kinematic positioning when only few GPS and few GLONASS Satellites (e.g. "2+2") can be tracked in given conditions?

Can it be equally configured to output its data tagged to GPS time (GPS week and seconds within GPS week) or GLONASS time (GLONASS day and seconds within GLONASS day)?

Can it be equally configured to output its computed position in the datum specific to GPS (i.e. WGS-84) or GLONASS (i.e. PZ-90.02)?

Can it be equally configured to output the receiver clock offset against the GPS or GLONASS system time?

Only after having answered YES to all these questions can one be sure the receiver actually is a truly GNSS-centric receiver. Otherwise, the receiver will better be described as a GPS-centric receiver, where GLONASS is only a crutch for GPS and not an independent player.

More and more new GNSSs are deployed. More and more new signals become available for end user. Will these GNSSs become new helpers for GPS? Or should they become equal partners? If a receiver is a true GNSS-centric receiver, then one may expect that adding yet another GNSS to the processing should be much easier than doing this for a GPS-centric receiver. That is, all GNSSs should be equal.

All GNSSs are equal, but some are more equal than others.

In the long term, no one will argue that the future of GNSS is toward GNSS-centric receivers. But does everyone understand that still for many years to come, GPS will remain the strongest GNSS partner?

Let us temporarily exclude SBAS and QZSS as not self-sufficient GNSSs, because unable to deliver position solutions by themselves. Now let us see from our own perspective what the primary differences are today between the four existing, self-sufficient GNSSs.

FIG. 3 is a table reflecting a forecast in 2011 of the status of GNSS constellations. Practice shows that such a forecast is not absolutely reliable. In the table of FIG. 3, MS (measurement space) corrections refer to standard base/network services, e.g. Ntrip (Networked Transport of RTCM via Internet Protocol) generating local-area correcting data, while SS (state space) corrections refer to global area correcting data, e.g. SBAS or L-band.

The table of FIG. 3 shows that GPS is clearly the leader, while GLONASS has become a matured player. All the others are still questionable. It must be noted that the potential accuracy for GPS and GLONASS should be the same in each positioning mode (standalone, differential, RTK) even though GLONASS FDMA may cause some headache (e.g. biases) compared to GPS. Algorithms to Calibrate and Compensate for GLONASS Biases in GNSS RTK Receivers working with 3rd party Networks, A. Boriskin, G. Zyryanov, Proceedings of ION-GPS '2008, Savannah, Ga.

But this difference in maturity does not mean that the GPS centric strategy is valid. So we have to think about the future today. FIG. 4 illustrates the view of the inventors that GPS and GLONASS should be treated equally.

FIG. 5 illustrates a scenario where a receiver on a ship in a canal receives signals from three GPS satellites and two GLONASS satellites. Operating in a "3+2" mode provides acceptable position determination with processing in accordance with some embodiments of the invention.

Being two (three, four, etc.) partners together is more efficient than one on its own. Also when two (three, four, etc.) partners are equal, then they offer maximum flexibility. This is also applicable to the GNSS world. But converting this observation into reality is not that easy.

Let us consider the following example. It is known a priori that GLONASS data being nominally almost of the same quality as GPS, are less reliable than GPS data. GPS-centered receiver will apply the easiest solution: down weight GLONASS data compared to GPS data to minimize the risk of degraded position because of unreliable GLONASS data. In this case extra GLONASS Satellites cannot improve final position because of low weight compared to GPS. On contrary, GNSS-centered receiver will try to consider GLONASS as equal partner and instead of down weighting will apply additional quality control schemes to isolate unreliable GLONASS data when needed. In this case, in nominal conditions GLONASS will play important positive role in overall receiver position.

A truly GNSS-centric receiver should be able to use all of the available satellite signals, even in the most difficult environments, which maximizes its ability to obtain reliable GNSS positions in the widest variety of conditions.

It is difficult to imagine a modern GNSS receiver without GPS tracking inside, even if this receiver is referred to as a "GLONASS navigator." While each GNSS system is quite independent of GPS, there can be a lot of hidden links and dependencies in the receiver firmware.

Looking at the source code of existing receiver firmware one would most probably find that it has been initially created in the GPS-only era. Also most probably, it has been adapted (generalized) later on to absorb at least GLONASS and/or Galileo. That is not the same as GNSS-centric.

The first goal towards designing a GNSS-centric receiver is to completely remove these "hidden links" from the receiver firmware. A proof of this is the ability to track GNSS signals and compute position without any knowledge of GPS, as if the receiver had no GPS option activated. That is, does the receiver have GPS as an option?

Once a receiver has started working without GPS, it is reasonable to ask which time are the data tagged to and which datum does the position refer to.

For multiple-GNSS receivers it is likewise reasonable to ask which time are the data tagged to and which datum does the position refer to. If the receiver has a unique (i.e. GNSS independent) time scale and datum, one can further ask how it manages the choice of GNSS that sets the data output principles.

Some characteristics of a "generic" GNSS receiver:
Can work without GPS
GPS is an option
A solution can be obtained with 3 GPS satellites and 2 GLO satellites A solution can be maintained with any four arbitrary satellites A solution can be provided in either datum (WGS84 or PZ90.02)

Everything can be tagged to GLONASS time rather than GPS time

We have formulated the high-level questions to address the primary principles of the GNSS-centric approach.

Do current GNSS systems (whether operating or only planned) fit the generic GNSS concept? Can we consider GLONASS with FDMA as generically the same as any CDMA system?

Are there any principal limitations to mix observables from different GNSSs in the position solution? What extra parameters are to be estimated additionally (and what is their dynamic model) when mixing GNSSs in the position solution? Can the receiver reliably initialize or update its position with multiple GNSS data when the data from any single GNSS are unable to do so?

With multiple GNSS tracking, do we want to have a possibility to name one GNSS as the primary GNSS? If so, can the primary GNSS be one of those that is not currently tracked? And what does primary GNSS mean?

With the growing variety of legacy data formats, do we understand that many of them are GPS-centric and will remain GPS-centric although being generated by GNSS-centric receiver? Are there any standards for presenting GNSS data that are not GPS-centric? If not, when can they be available?

Benefits of the GNSS-centric approach:

Better reliability

Better availability

Better protection from jamming

Better TTFF (time-to-first-fix) statistic

The next section addresses these questions for GNSS receiver firmware.

By "generic" is meant that each particular GNSS is not described from scratch, but only contains some particular clarifications for such or such signal particularities and related algorithms in order to track and process it properly.

One can show the differences of each GNSS in several layers of detail. One who wants to prove that all GNSSs are different will formally succeed.

Instead, our approach is to define a layer common to all GNSSs through which we define a "generic" GNSS.

All GNSS are ranging Navigation systems, and their signals allow estimating delays of each signal carrier (phase measurements) and each signal envelope (pseudo-range measurement), then there is an attractive desire to introduce so called generic GNSS which observables can be clearly described. For example, all 4 basic types of observables (pseudo range, carrier phase, Doppler and Signal strength) are generic parameters as already claimed in RINEX standard. At the same time, at least 2 parameters are specific for each GNSS system: reference time scale and GNSS signal type. So once generic GNSS system is defined, each real GNSS system will require to define only 2 GNSS-specific parameters.

Raw GNSS observables are useful as a starting layer in the definition of a generic GNSS and for designing real-time and office GNSS applications, but not sufficient in general for GNSS core algorithms. Nevertheless, Ashtech did its best to design a more elaborate layer, achieving a major step towards the generalization of the signal search, acquisition, tracking and decoding tasks, routines and functions.

The following describes a GNSS firmware platform which is completely generic and GNSS-centric.

Standalone positioning processing with any single GNSS is well known. Some simple variants (like epoch-by-epoch linearized [multi-iterative] Least Mean Square) are also known.

But for multiple GNSSs and filtered solutions involving (differential) carrier data, then position engine algorithms are not so obvious. Moreover, objectively differences exist between the different GNSSs (e.g. time offset) with varying interpretations from the different manufacturers. Thus, the receiver must carefully handle multiple GNSS reference data from a $3^{rd}$ party reference receiver or network.

Let us consider more in detail the so-called time offset between different GNSSs. How to handle it? Should we consider it as known from a navigation message (e.g. GLONASS transmits such information)? Should we include it into the set of parameters to be estimated, along with coordinates? And if so, what dynamic model should be used? What should be done when your data are corrected by $3^{rd}$ party reference data? More questions than answers.

We have attempted to estimate the GPS-GLONASS time offset using standardized RTCM-3 (MT 1004+1012) messages generated by professional receivers from different manufacturers. We made sure that using the same estimation algorithm (Ashtech based), we get very different results. And we cannot refer this difference only to FDMA-related hardware biases [see Algorithms to Calibrate and Compensate for GLONASS Biases in GNSS RTK Receivers working with 3rd party Networks, A. Boriskin, G. Zyryanov, Proceedings of ION-GPS '2008, Savannah, Ga.]: some difference in interpretation still exist. If so, we do not see why, for example, the GPS-GALILEO time shift, will be equally interpreted by different players.

It is proven already that the difference between time scales of each GNSS is slow process and once estimated can be applied for a long time afterwards. In most of the cases, proper tightly coupled dynamic model for GNSS clocks can be applied in position engine (e.g. built as Kalman Filter). Such a model allows positioning with less number of Satellites from different GNSS compared to simplified LMS solution. With receiver start up, some a priori time offsets (between different GNSS) can be used. These a priori offsets can be often extracted from GNSS navigation message, e.g. we know that GPS-GLONASS time shift is contained in GLONASS ephemeris data.

GNSS-centric receiver firmware must assume generally a priori unknown time offsets between different GNSSs, especially when equipment from different manufacturers is included into the positioning process. This also means that no internally fixed primary GNSS (against which all clock offsets are estimated) must be selected. Otherwise, the receiver is centric to one specific GNSS system.

One strategy is to estimate each clock independently but apply some reasonable internal constraints (as part of a functional and dynamic model) for their difference. The states to be estimated are:

$$Dt(i)=GNSS(i)\text{clock}-\text{receiver clock}$$

Each Dt parameter demonstrates high dynamic properties because receiver clock is very unpredictable. But at the same time $Dt(i)-Dt(j)=GNSS(i)\text{clock}-GNSS(j)\text{clock}$ is very stable in time. So when modeling all Dt(i) in the position engine, proper tightly coupled clock model must be applied which reflect the assumptions that all Dt(i) can change fast but quite synchronously.

Most GNSS users are patriots by heart or because of government regulations. Here patriotism means that the data generated by a GNSS device operating in a given area must be comfortable for native players. In the case of GNSS, comfortable means 'something' centered around 'primary' GNSS. In turn 'something' means at least:
  Preferred position datum
  Preferred data time tagging
while 'primary' refers to a native (or preferred) GNSS.

For example, Russian users (especially those working for government organizations) may prefer to get positions on the PZ-90.02 datum and raw data tagged to GLONASS time (seconds within GLONASS day, the day within four-year GLONASS cycle), even when in given conditions GLONASS is not tracked. A similar assumption may be made for example for a Chinese user and COMPASS.

Thus it is desirable to have GNSS-centric receiver firmware to support the selection of a so-called Primary GNSS System (PGS) regardless of whether at any given moment this primary GNSS is tracked or not. This is precisely what Ashtech receivers allow users to specify. For example, a user in Russia may wish to configure the receiver in GLONASS-primary mode.

At the same time, selecting a PGS does not mean that one GNSS system is internally 'more equal' than the others, i.e. uses higher weights in position calculation or takes an advantage in tracking channels assignment. No, these extreme ideas can come only to people who are more concerned with formal rules than with user performance.

In Ashtech receivers, the choice of a PGS defines only data output conditions while all internal receiver algorithms are kept strictly not centered around the PGS.

One can assume that many existing data formats (standardized and proprietary) are still GPS-centric. That is why if GNSS-centric receiver firmware has to support such legacy messages, one can consider the corresponding receiver to be GPS-centric.

For example, the well-known RTCM-2 format supports GPS and GLONASS. RTCM STANDARD FOR DIFFERENTIAL GNSS SERVICE—VERSION 2.3, RTCM SPECIAL COMMITTEE NO. 104, Aug. 20, 2001. But it is not planned to support other GNSSs, at least for high precision (RTK) messages like 18 and 19. More than that, some GLONASS related messages, e.g. 31 and 32 are ambiguous (especially after transition from PZ90 to PZ90.02) and probably can cause some interoperability problems. That is why RTCM-2 cannot be considered as GNSS-centric.

The well-known CMR format is GPS-centric even though there are CMR messages supporting GLONASS (and possibly other systems). But GLONASS looks asymmetric here. Moreover, there is a proprietary Trimble CMR GLONASS message and the open Leica/Topcon CMR message (supported by Ashtech and other manufacturers).

The most promising are RTCM-3 (real time) and RINEX-3 (archiving) formats which can be considered as GNSS-centric. RTCM STANDARD FOR DIFFERENTIAL GNSS SERVICES—VERSION 3, RTCM SPECIAL COMMITTEE NO. 104, Jul. 1, 2011. GNSS-centric receivers must therefore support RTCM-3 generation and provide a converter of proprietary data to RINEX-3.

Ashtech receivers provide such a possibility.

Performance assessment does not like the philosophical considerations above. It likes proof. It's only interested in showing what GNSS-centric receivers can do compared to GPS-centric ones. That is why we intentionally deal with user cases where the difference is clearly seen. It is not in open-sky conditions (where the number of GPS satellites is good enough to allow GPS-only positioning) that we will demonstrate the benefits of the GNSS-centric concept.

FIG. 6A and FIG. 6B shows a comparison of accuracy between GNSS-centric processing and GPS-centric processing in an open sky environment. FIG. 6A shows the open-sky environment with an elevation mask of 5 degrees. The table of FIG. 6B indicates that accuracy is almost identical (1 cm) for GPS-only, GLONASS-only, GPS-centric (GPS+GLONASS) and GNSS-centric (GPS+GLONASS).

FIG. 7A and FIG. 7B show a comparison of accuracy between GNSS-centric processing and GPS-centric processing in a non-open-sky environment. FIG. 7A shows the simulation of a non-open-sky environment (e.g., an urban canyon) by stepping the elevation mask up to 50 degrees. The table of FIG. 7B indicates that a fix is not available for GPS-only, GLONASS-only and GPS-centric (GPS+GLONASS), but that accuracy of 3-5 is available for GNSS-centric (GPS+GLONASS).

To demonstrate the advantage of GNSS-centric over GPS-centric, we selected four user cases and their corresponding tests:
  RTK initialization against our own base
  RTK initialization against $3^{rd}$ party Network
  Fixed RTK accuracy
  Urban drives 'Competitors' for this demonstration were selected as follows. The GNSS-centric receiver is the Ashtech MB500 GPS+GLONASS L1/L2 OEM board. The GPS-centric receiver is a board of the same type but with intentionally added limitation to not process GLONASS data if GPS only data are not sufficient to generate admissible position. In all the test cases below, both 'competitors' applied the very same default settings; particularly no static assumption was made when processing static data.

RTK Initialization Against our Own Base

Here we applied an off-line evaluation strategy. Base and rover GPS+GLONASS L1/L2 raw data were collected on the office roof with two MB500s (base and rover). The baseline was 86 meters long.

A PC version of the Ashtech RTK engine was run with these data in different modes, with RTK auto-reset every 300 seconds. Each 300 seconds trial is reported as either:
  RTK baseline is not initialized, or
  RTK baseline is initialized but Float, or
  RTK baseline is initialized and Fixed Having had 46 independent trials, we got all of them initialized and fixed in each of 4 modes:
  GLONASS only (GLO)
  GPS only (GPS)
  GPS-centric GPS+GLONASS (Gg)
  GNSS-centric GPS+GLONASS (GG)

FIG. 8 is a graph showing comparative results of RTK (real-time-kinematic) initialization trials under open-sky conditions, with an elevation mask of 5 degrees. Fixed-ambiguity ("fixed") solutions are obtained in a high percentage of the trials for GPS-only, GLONASS-only, GPS-centric (GPS+GLONASS) and GNSS-centric (GPS+GLONASS). Open-sky, short baselines can easily be fixed in each L1/L2 configuration, even in GLONASS-only mode.

FIG. 9A is a graph showing comparative results of RTK initialization trials using the same evaluation method with the receiver's own base and with an elevation mask of 30 degrees. GNSS-centered performance has not been changed at all, while in all the other modes, a noticeable percentage of trials could not be initialized at all.

FIG. 9B is a graph showing comparative results of RTK initialization trials using the receiver's own base with an elevation mask of 40 degrees. In this example, the difference became dramatic.

With an elevation mask of 50 degrees, only the GNSS-centric receiver was able to initialize the baseline in 29 (out of 46) cases and even fixed 8 of them. With this makes, the other modes did not succeed, even with baseline initialization.

Thus, the GNSS-centric receiver is the only suitable one in noticeably obscured sky. Also one can see that using a GPS-centric receiver the same performance is achieved with GPS+GLONASS and GPS only, which proves once more that GLONASS must be used as an equal partner, not as a "mate".

RTK Initialization Against 3$^{rd}$ Party Network

Real life field data were collected in an Ntrip network where reference data were generated by 3$^{rd}$ party network receivers and software, and corresponded to a non-physical reference station. The same evaluation was performed with these data as in the previous section.

There were two principal differences between this test and the previous one:
  Reference data here correspond to a 3$^{rd}$ party receiver with known type (or so-called GLONASS bias class). That is why the Ashtech rover applied the corresponding pre-calibrated GLONASS bias table, hardcoded in the receiver firmware.
  The Network provider is too conservative when it comes to generating GLONASS reference data. We clearly see that there are no reference data for many GLONASS Satellites tracked on rover side. That is why the GLONASS-only statistic is much worse than GPS-only statistic.

There were 103 independent sequential trials, 300 seconds each. With no elevation mask applied, all the trials were RTK initialized and fixed (except GLONASS-only mode due to the lack of network data for GLONASS satellites noted above).

FIG. 10A is a graph showing comparative results of RTK initialization trials using third-party network corrections with an elevation mask of 30 degrees.

FIG. 10B is a graph showing comparative results of RTK initialization trials using third-party network corrections with an elevation mask of 40 degrees.

In this example, the advantage of a GNSS-centered receiver is not so clearly seen, but it is explained by the conservatism of the network provider as far as GLONASS is concerned.

FIG. 11A is a graph comparing the horizontal (HRMS) position accuracy and vertical (VRMS) position accuracy of RTK fixed solutions obtained using third-party network corrections for different GNSS modes, with no elevation constraint.

FIG. 11B is a graph comparing the horizontal (HRMS) position accuracy and vertical (VRMS) position accuracy of RTK fixed solutions obtained using third-party network corrections for different GNSS modes, using a 30-degree mask.

FIG. 12 shows a plan view of a portion of a real-time drive test under medium shaded conditions. The GPS-centric mode obtained an RTK float solution 26% of the time and an RTK fixed solution 74% of the time. In comparison, the GNSS-centric mode obtain an RTK float solution 19% of the time and an RTK fixed solution 81% of the time.

FIG. 13 shows a plan view of a portion of a real-time drive test under heavily shaded conditions. The GPS-centric mode obtained an RTK float solution 82% of the time and an RTK fixed solution 18% of the time. In comparison, the GNSS-centric mode obtain an RTK float solution 74% of the time and an RTK fixed solution 26% of the time.

Conclusions:
  GLONASS is mature enough to become an equal partner to GPS
  Benefits result from thinking in a non-GPS-centric way
  GNSS-centric approach offers better availability and reliability
  GNSS-centric approach is open for the coming GALILEO and COMPASS systems FIG. 14 shows at 1400 a high-level view of the processing flow of a typical GPS-centric receiver. At 1405 a check is made whether GPS satellites are available (tracked). If yes, then at 1410 GLONASS and GALILEO satellites are also tracked.

This means that the typical GPS-centric receiver will not even try to search and track other-than-GPS satellites until at least one GPS satellite is acquired. The main reason for this is possible problems with GNSS and receiver time, which are usually synchronized in the GPS-centered receiver after receiving at least one GPS satellite.

At 1415 a check is made whether more than four GPS satellites are available. If yes, standalone positions computation is done at 1420.

Once the approximate time is known, the GPS-centered receiver can look for other GNSS satellites, i.e., assign channels for tracking and set time/frequency search windows. (Exact time synchronization can be achieved only after running the position engine with four or more satellites which delivers estimates of three-dimensional position and receiver clock offset from GPS time.) In some cases, assignment of channels for tracking can only be done if position is first computed; in this case, other GNSS tracking can start even after the first (GPS-derived) position is computed.

The GPS-centered receiver requires availability of at least four GPS satellites to compute three-dimensional position. Such a receiver cannot take advantage of other GNSS data to compute position if the number of available GPS satellites is three or fewer. If four or more GPS satellites are available, then other GNSS data can be acquired into the position estimation process, just because they are mates and not equal partners.

At 1425 a check is made whether more than five GPS satellites are available. If yes, then RTK positions computation is done at 1430.

RTK is a much more sensitive position estimation mode and usually requires, for higher reliability, more satellites for (a) initialization of the first float solution, which usually requires availability of at least five satellites, (b) initialization of the first fixed solution, which usually requires availability of at least six satellites, and (c) maintenance of a fixed or float solution, which usually requires availability of at least five satellites. That is why the number of satellites indicated at 1425 as the minimum for RTK computations is six (more than five GPS satellites available).

With the GPS-centered receiver, other GNSS data can be added to the RTK process after a float or fixed RTK position is initialized with GPS satellite observations. No RTK solution is available for such a receiver if the number of available GPS satellites is less than five or six.

FIG. 15 shows at 1500 a high-level view of the processing flow of a GNSS-centric receiver in accordance with some embodiments of the invention. Satellites of multiple GNSS are tracked simultaneously, in parallel: GLONASS satellites are tracked at 1505, GPS satellites are tracked at 1510, GALILEO satellites are tracked at 1515, and satellites of any further GNSS system (e.g., COMPASS) are tracked at 1520. This means that satellites of each of multiple GNSS which the receiver is capable of tracking are acquired and tracked independently of the other GNSS. The GNSS which the receiver is capable of tracking may depend on receiver options, e.g., the receiver may be capable of tracking satellite of any two or more GNSS.

At 1525 a check is made whether more than four satellites are available (tracked), regardless of the GNSS system to which they belong.

MUM Estimating position requires observations any four satellites, even the case of "1+1+1+1" (one satellite from each of four GNSS). This is possible because: (a) estimating the difference between time scales of the GNSS is a slow process and, once estimated, can be applied for a long time afterwards; and (b) at receiver start up there can be no such estimates, but navigation data can contain the estimate of such a difference (at least we know that the GPS-GLONASS time shift is contained in the GLONASS navigation message).

If yes, standalone positions computation is done at 1530. At 1535 a check is made whether more than five satellites are available, regardless of the GNSS system to which they belong. If yes, then RTK positions computation is done at 1540.

As usual, RTK mode usually requires more satellites for the same reasons discussed above. But with the GNSS-centric receiver the necessary five satellites can be selected from different GNSS constellations for initialization in float mode. Usually more than five satellites are needed for fixed-ambiguity mode.

FIG. 16 is a block diagram of a typical integrated GNSS receiver system 1600 with GNSS antenna 1605 and communications antenna 1610. The Ashtech ProMark800 receiver is an example of such a system. Receiver system 1600 can serve as a rover or base station or reference station. Receiver system 1600 includes a GNSS receiver 1615, a computer system 1620 and one or more communications links 1625. Computer system 1620 includes one or more processors 1630, one or more data storage elements 1635, program code 1640 with instructions for controlling the processor(s) 1630, and user input/output devices 1645 which may include one or more output devices 1650 such as a display or speaker or printer and one or more devices 1655 for receiving user input such as a keyboard or touch pad or mouse or microphone.

FIG. 17 is a schematic diagram of a computer system in accordance with some embodiments of the invention. Computer system 1720 includes one or more processors 1730, one or more data storage elements 1735, program code 1740 with instructions for controlling the processor(s) 1730, and user input/output devices 1745 which may include one or more output devices 1750 such as a display or speaker or printer and one or more devices 1755 for receiving user input such as a keyboard or touch pad or mouse or microphone.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an operating system such as a version of Microsoft® Windows®, or a version of the Unix operating system such as Linux. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a non-transitory medium such as magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method of determining a position of an antenna of a global navigation satellite system (GNSS) receiver, the method comprising:
   tracking satellites of at least two GNSS systems to obtain first observation data from one or more satellites of a first GNSS system of the at least two GNSS systems and to obtain second observation data from one or more satellites of a second GNSS system of the at least two GNSS systems, the first observation data and the second observation data obtained over a number of epochs, the first observation data including pseudo range, carrier phase, and timing data based on a clock of the first GNSS system, and the second observation data including pseudo range, carrier phase, and timing data based on a clock of the second GNSS system;
   estimating a first clock difference between the clock of the first GNSS system and a clock of the GNSS receiver;
   estimating a second clock difference between the clock of the second GNSS system and the clock of the GNSS receiver independently from estimating the first clock difference;
   determining a constraint regarding a difference between the first clock difference and the second clock difference; and
   when at least four satellites are tracked, computing a standalone antenna position of the GNSS receiver using the first observation data and the second observation data of the tracked satellites, the first clock difference and the second clock difference, and the constraint.

2. A method of determining a position of an antenna of a global navigation satellite system (GNSS) receiver, the method comprising:
   tracking satellites of at least two GNSS systems to obtain first observation data from one or more satellites of a first GNSS system of the at least two GNSS systems and to obtain second observation data from one or more satellites of a second GNSS system of the at least two GNSS systems, the first observation data and the second observation data obtained over a number of epochs, the first observation data including pseudo range, carrier phase, and timing data based on a clock of the first GNSS system, and the second observation data including pseudo range, carrier phase, and timing data based on a clock of the second GNSS system;
   estimating a first clock difference between the clock of the first GNSS system and a clock of the GNSS receiver;
   estimating a second clock difference between the clock of the second GNSS system and the clock of the GNSS receiver independently from estimating the first clock difference;
   determining a constraint regarding a difference between the first clock difference and the second clock difference; and
   when at least five satellites are tracked computing a real-time kinematic (RTK) phase differential antenna position of the GNSS receiver using the first observation data and the second observation data of the tracked satellites, the first clock difference and the second clock difference, and the constraint.

3. A non-transitory computer program product comprising: a computer usable medium having computer readable instructions physically embodied therein, the computer readable instructions when executed by a processor enabling the processor to perform the method of claim 1.

4. A global navigation satellite system (GNSS) apparatus comprising:
   a GNSS receiver configured to track satellites of at least two GNSS systems to obtain first observation data from one or more satellites of a first GNSS system of the at least two GNSS system and to obtain second observation data from one or more satellites of a second GNSS system of the at least two GNSS systems, the first observation data and the second observation data obtained over a number of epochs, the first observation data including pseudo range, carrier phase, and timing data based on a clock of the first GNSS system, and the second observation data including pseudo range, carrier phase, and timing data based on a clock of the second GNSS system; and
   at least one processor with instructions enabling the at least one processor to:
      estimate a first clock difference between the first GNSS system and a clock of the GNSS receiver;
      estimate a second clock difference between the second GNSS system and the clock of the GNSS receiver independently from estimating the first clock difference;
      determine a constraint regarding a difference between the first clock difference and the second clock difference; and
      when at least four satellites are tracked, compute a standalone antenna position of the GNSS receiver using the first observation data and the second observation data of the tracked satellites, the first clock difference and the second clock difference, and the constraint.

5. The apparatus of claim 4, wherein the at least one processor is further operative to:
when at least five satellites are tracked, in addition to computing the standalone antenna position of the GNSS receiver, compute a real-time kinematic (RTK) phase differential antenna position of the GNSS receiver using the first observation data and the second observation data of the tracked satellites, the first clock difference and the second clock difference, and the constraint.

6. The method of claim 1, wherein the at least two GNSS systems include Global Position System (GPS) and Global Navigation Satellite System (GLONASS).

7. The method of claim 1, wherein the first observation data and the second observation data are presented in Version 3 of Receiver Independent Exchange (RINEX-3) format or Version 3 of Radio Technical Commission for Maritime Services (RTCM-3) format.

8. The GNSS apparatus of claim 4, wherein the at least two GNSS systems include Global Position System (GPS) and Global Navigation Satellite System (GLONASS).

9. The GNSS apparatus of claim 4, wherein the first observation data and the second observation data are presented in Version 3 of Receiver Independent Exchange (RINEX-3) format or Version 3 of Radio Technical Commission for Maritime Services (RTCM-3) format.

10. A non-transitory computer program product comprising: a computer usable medium having computer readable instructions physically embodied therein, the computer readable instructions when executed by a processor enabling the processor to perform the method of claim 2.

11. The method of claim 2, wherein the at least two GNSS systems include Global Position System (GPS) and Global Navigation Satellite System (GLONASS).

12. The method of claim 2, wherein the first observation data and the second observation data are presented in Version 3 of Receiver Independent Exchange (RINEX-3) format or Version 3 of Radio Technical Commission for Maritime Services (RTCM-3) format.

13. The method of claim 1, wherein the at least two GNSS systems do not include Global Position System (GPS).

14. The method of claim 2, wherein the at least two GNSS systems do not include Global Position System (GPS).

15. The GNSS apparatus of claim 4, wherein the at least two GNSS systems do not include Global Position System (GPS).

* * * * *